United States Patent
Huang et al.

(10) Patent No.: US 11,016,787 B2
(45) Date of Patent: May 25, 2021

(54) VEHICLE CONTROLLING SYSTEM AND CONTROLLING METHOD THEREOF

(71) Applicants: Mindtronic AI Co., Ltd., Grand Cayman (KY); Shanghai XPT Technology Limited, Shanghai (CN)

(72) Inventors: Mu-Jen Huang, Taipei (TW); Ya-Li Tai, Taoyuan (TW); Yu-Sian Jiang, Kaohsiung (TW)

(73) Assignees: Mindtronic AI Co., Ltd., Grand Cayman (KY); Shanghai XPT Technology Limited, Shanghai (CN)

( * ) Notice: Subject to any disclaimer, the term of this patent is extended or adjusted under 35 U.S.C. 154(b) by 168 days.

(21) Appl. No.: 16/183,740

(22) Filed: Nov. 8, 2018

(65) Prior Publication Data

US 2019/0138327 A1    May 9, 2019

(30) Foreign Application Priority Data

Nov. 9, 2017 (CN) .......................... 201711100379.3
Nov. 9, 2017 (CN) .......................... 201721486529.4

(51) Int. Cl.
| | |
|---|---|
| *G06F 9/44* | (2018.01) |
| *G06F 9/445* | (2018.01) |
| *G06K 9/00* | (2006.01) |
| *H04N 7/18* | (2006.01) |
| *G06N 5/04* | (2006.01) |

(52) U.S. Cl.
CPC ..... *G06F 9/44505* (2013.01); *G06K 9/00288* (2013.01); *G06N 5/04* (2013.01); *H04N 7/183* (2013.01); *H04N 7/188* (2013.01)

(58) Field of Classification Search
CPC .. G06F 9/44505; G06K 9/00288; G06N 5/04; H04N 7/183; H04N 7/188
See application file for complete search history.

(56) References Cited

U.S. PATENT DOCUMENTS

| | | | | |
|---|---|---|---|---|
| 6,176,587 | B1 * | 1/2001 | Fredricks | B60R 1/02 307/10.1 |
| 6,927,694 | B1 * | 8/2005 | Smith | B60K 28/066 340/573.1 |
| 10,313,819 | B1 * | 6/2019 | Dublin | H04S 3/008 |
| 2007/0074114 | A1 * | 3/2007 | Adjali | G06F 3/01 715/706 |
| 2010/0105426 | A1 * | 4/2010 | Jaiswal | H04M 1/576 455/556.1 |
| 2015/0131857 | A1 * | 5/2015 | Han | G06K 9/00845 382/103 |
| 2015/0294429 | A1 * | 10/2015 | Williams | G06Q 50/01 705/319 |
| 2016/0039429 | A1 * | 2/2016 | Abou-Nasr | G06F 3/017 382/103 |

(Continued)

FOREIGN PATENT DOCUMENTS

| | | | | |
|---|---|---|---|---|
| AT | | 14945 U1 * | 9/2016 | ......... G06Q 30/0266 |
| CN | 21310267424 | * | 6/2013 | |

*Primary Examiner* — Zahid Choudhury
(74) *Attorney, Agent, or Firm* — Winston Hsu

(57) ABSTRACT

A system provided for configuring settings of a device installed in a vehicle based on a user's personal attributes. The system includes an inference module that dynamically gathers one or more personal attributes of the user, and a control unit that applies a configuration to the device based on the personal attributes.

14 Claims, 3 Drawing Sheets

(56) References Cited

U.S. PATENT DOCUMENTS

| | | | |
|---|---|---|---|
| 2017/0057436 A1* | 3/2017 | Dow | B60N 2/0224 |
| 2018/0341811 A1* | 11/2018 | Bendale | G02B 27/0172 |
| 2019/0146486 A1* | 5/2019 | Doster | G06Q 10/04 |
| | | | 701/29.3 |
| 2019/0375354 A1* | 12/2019 | Akella | B60R 16/037 |
| 2020/0009963 A1* | 1/2020 | Fujiwara | H04W 4/50 |

* cited by examiner

| Configuration of Digital Dashboard / Vector | Theme 1 | Theme 2 | ⋮ | ⋮ | ⋮ | Theme n |
|---|---|---|---|---|---|---|
|  | $(G_1, A_1, E_1)$ | $(G_2, A_2, E_2)$ | ⋮ | ⋮ | ⋮ | $(G_n, A_n, E_n)$ |

FIG. 3

VEHICLE CONTROLLING SYSTEM AND CONTROLLING METHOD THEREOF

BACKGROUND OF THE INVENTION

1. Field of the Invention

The present invention relates to a vehicle configuration system and an associated method, and more particularly to a vehicle configuration system and an associated method that configures a vehicle based on personal attributes of users in the vehicle.

2. Description of the Prior Art

Technological developments have led to the implementation of what is known as a sharing economy in many societies. A vehicle sharing service or a vehicle rental service allows users to share a vehicle without purchasing it.

Different users, however, may have different preferences regarding vehicle configurations. The problem of sharing a vehicle with others is whenever a user is ready to use a shared vehicle, he/she has to modify the settings to fit his/her own preferences. This may take time especially when the model of the shared vehicle is new to the user, and he/she is not familiar with the configurations.

SUMMARY OF THE INVENTION

The present invention provides a system and an associated method adopting to vehicles.

The present disclosure provides a system that configures a device installed in a vehicle based on a plurality of personal attributes of a user in the vehicle. The system includes: a storage unit configured to store a plurality of configurations of the device; an inference module configured to gather the personal attributes dynamically in real-time; and a control unit coupled to the inference module and the storage unit. The control unit is configured to dynamically apply one of the configurations to the device based the personal attributes.

The present disclosure also provides a method of configuring a device installed in a vehicle according to a plurality of personal attributes of a user in the vehicle. The method includes: storing a plurality of configurations in a storage unit; gathering, through an inference module, the user's personal attributes dynamically in real-time; and applying, through a control unit, one of the configurations dynamically to the device based on the personal attributes.

The present disclosure further provides a non-transitory machine-readable storage medium including instructions, which performed by one or more processors, causing the one or more processors to perform a method in a vehicle to configure settings of a device installed in the based on a plurality of personal attributes of a user in the vehicle. The method includes: storing a plurality of configurations applicable to the device in a storage unit; capturing a facial image of a user in a vehicle continuously; extracting a plurality of facial descriptors of the user based on the facial image; inferring a plurality of personal attributes dynamically based on the facial descriptors in real-time; and applying one of the configurations to the device dynamically based on the personal attributes.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a table showing a number of combinations of personal attributes each of them corresponds to a configuration.

DETAILED DESCRIPTION

Figure 1:
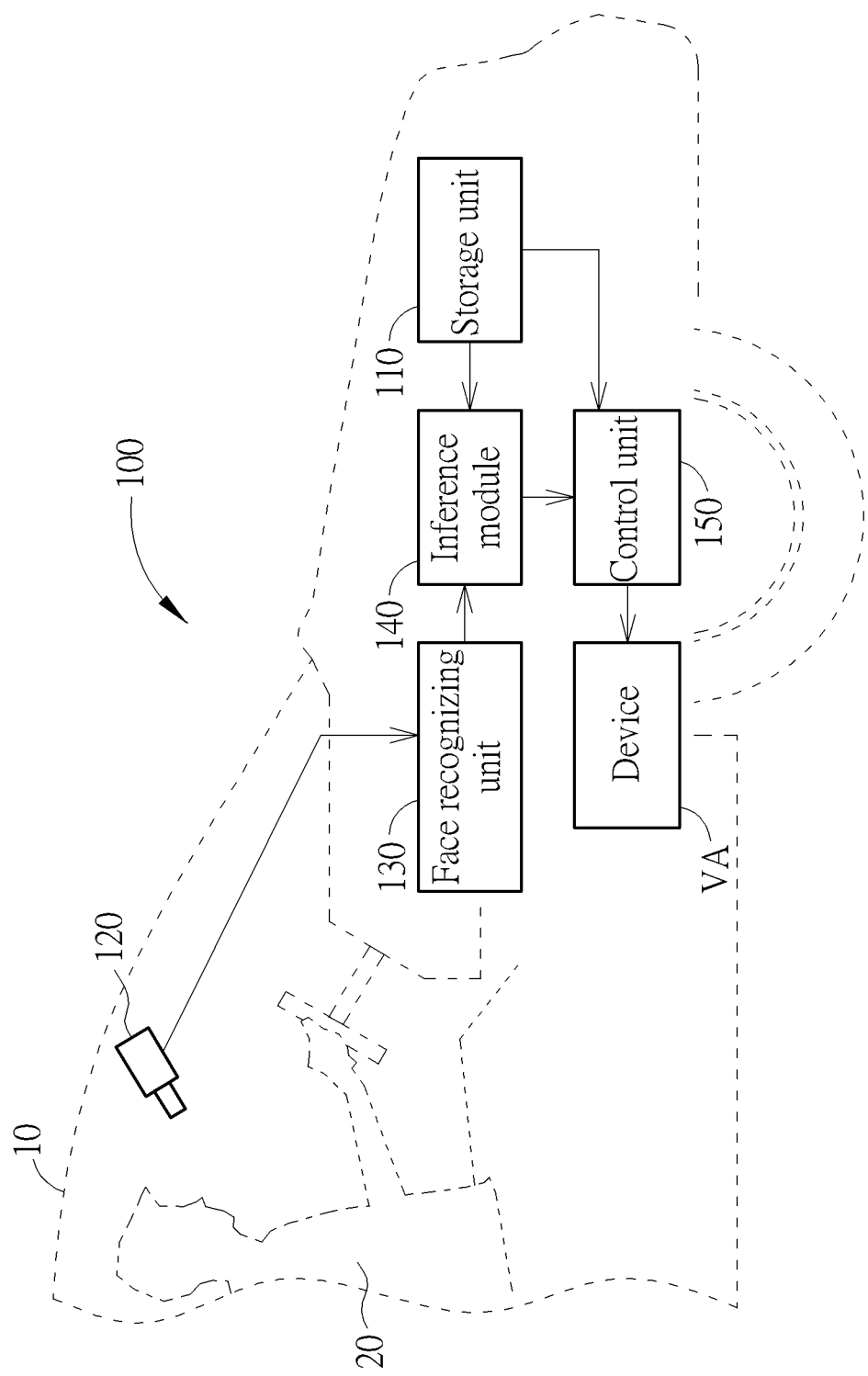
FIG. 1 is a schematic diagram showing a vehicle configuration system of the present invention.

To provide a better understanding of the present invention, preferred embodiments will be detailed as follows. The preferred embodiments of the present invention are illustrated in the accompanying drawings with numbered elements to elaborate on the contents and effects to be achieved. It should be noted that the drawings are simplified schematics, and therefore show only the components and combinations associated with the present invention, in order to provide a clearer description of the basic architecture or method of implementation. The components would be complex in reality. In addition, for ease of explanation, the components shown in the drawings may not represent their actual number, shape, and dimensions; details can be adjusted according to design requirements.

In view of the foregoing issues, the present invention provides a configuration system and a method thereof which, based upon a user's personal attributes, modifies settlings of devices VAs installed in a vehicle. The user could either be the driver or passenger(s) of the vehicle. The modifications may be made to any devices VAs in the vehicle capable of changing the settings and/or preferential themes, such as, an instrument cluster and an infotainment system. It should be noted in the present invention the personal attributes are obtained majorly based upon the user's facial descriptors. The operation of the invention guesses what people of a specific type may prefer when it comes to device settings. This may save users time and troubles particularly when they are not familiar with the configurations of vehicles.

As shown in FIG. 1, a configuration system 100 of the present invention includes an image capturing device 120, a face recognizing unit 130, an inference module 140 and a control unit 150. The system 100 may further include a storage unit 110 connected to the inference module 140 and the control unit 150. Although all units, devices and modules of the configuration system 100 are situated in the vehicle 10 as shown in FIG. 1, the present invention is not limited thereto. For example, the functions of the face recognizing unit 130, the inference module 140 and the storage unit 110 may be achieved by cloud-based devices capable of performing the same. The signals therefore generated may be wirelessly transmitted to other units, devices or modules in the vehicle 10.

The inference module 140 is provided to infer personal attributes of users. The personal attributes may include gender and age of the user 20. Additionally, the inference module 140 may further identify the user's emotional states. The inference is made through a pretrained model. As stated previously, in the present invention the facial descriptors are referenced to infer the user's personal attributes. To get a more accurate result, volume data are collected and analyzed through deep learnings and/or machine learnings beforehand to train the inference module 140. For instance, numbers of facial images of persons whose genders and ages are known are fed into a database. The inference module 140 then extracts the R-G-B (red, green and blue) combinations on each of the facial descriptors from the facial images and converses them into matrixes for later processing. In one case, if the resolution of a facial image is a m*n, the facial image is converted into a two-dimension matrix of (m*n*3) *1. Precisely, the R-G-B combination at the relevant position of a facial descriptor is represented by a two-dimension matrix. It should be noted that a two-dimension matrix is adopted here for an illustrative purpose only and should not become a limitation to the present invention in any event. After several matrix conversions and calculations, the inference module 140 indexes the facial descriptors of various combinations in relation to a person with a specific gender and at a (or a range of) particular age. The inference module 140 can therefore be able to classify the user's gender and/or the age by comparing the facial descriptors extracted from a captured image against the trained data. For example, if the user has similar facial descriptors of a 24-year-old male, the user's gender and/or age can therefore be inferred by the inference module 140. In one example, the age range according to the present invention may be i) those who are below 44-year-old, ii) those who are between 45- to 59-year-old, iii) those who are between 60- to 74-year-old, iv) those who are between 75- to 89-year-old, and v) those who are above 90-year-old.

Additionally, through the same manner, the inference module 140 can learn to tell in what mood the user is based on the facial descriptors and therefore adjust the settings of a device VA accordingly. In another instance, the inference of the user's emotion may be made by, instead of a mere facial image, a facial motion constituted by a series of facial images. Alternatively, it may be inferred from the user's biological parameters, such as heartbeat, blood pressure, etc.

Apart from that, the configuration system 100 also includes an image capturing device 120 provided to capture facial images of a user 20 in the vehicle 10. The image capturing device 120 may be located at a place where it can capture the user's face properly, such as on a windshield, a rear-mirror, or a roof of the vehicle 10, etc. In one embodiment, the image capturing device 120 may be a camera or other device capable of capturing images. As mentioned, the user 20 in the present invention may be the driver or the passenger(s) of the vehicle.

Moreover, the face recognizing unit 130 is connected to the image capturing device 120 provided to extract facial descriptors from the facial images of the user 20. To accelerate the processing time, in one instance, the face recognizing unit 130 may firstly exclude portions from the facial images which are irrelevant to the identification of the facial descriptors, such as, the background or the hair, etc. The face recognizing unit 130 may then extract facial descriptors from the remaining portions of the facial images.

The control unit 150 is connected to the inference module 140 provided to adjust settings of devices VAs installed in a vehicle based on personal attributes such as the gender and/or the age of the user 20. Moreover, the control unit 150 may also modify the settings of the advices VAs in the vehicle based upon the user's emotional states.

It should be noted that in the present invention the modification may be made pursuing to the user's gender, age, emotional states, or any combination of them. As discussed previously, the user's gender, age as well as the emotion states are inferred by the inference module 140 based on facial descriptors. Moreover, the devices VAs in the vehicle may include, without limitation, a digital dashboard, an instrument cluster, a center informative display (CID), a head up display (HUD), a navigation device, a multi-media player (such as an audio device, a broadcast device or a video player), or an infotainment system.

The storage unit 110 is a type of non-volatile memory and can be removable or non-removable. The storage unit 110 includes, for instance, non-transitory computer readable media such as magnetic disks (e.g., hard drives), magnetic tapes, or cassettes, optical storage media (e.g., CD-ROMs or DVDs), or any other tangible non-transitory storage medium that can be used to store information and which can be accessed within or by the computing hardware environment.

As iterated, the present invention provides a configuration system and a method thereof to adjust the settings of devices VAs installed in a vehicle based on personal attributes. The user may be the driver and/or the passenger(s) of the vehicle. The personal attributes may include gender, age, mood etc. It should be noted that in the present disclosure some of the personal attributes are not constant. For those personal attributes such as the user's mood that may change from time to time, the configuration system 100 of the present disclosure can modify the configurations of the device dynamically. Specifically, the image capturing module 120 may capture facial images of the user continuously. The inference module 140 then, based on the facial descriptors from the facial images, gathers the personal attributes of the user dynamically in real-time. For instance, assuming the user is in a sad mood and the infotainment is playing jazz because of the user's current emotional state. Awhile later, the user hears good news and now is excited. The inference module 140 gathers the current emotional state. Based on the real-time personal attribute, i.e. the emotional state, the configuration system 100 of the present disclosure therefore dynamically modifies the music that the infotainment plays to, for example, rock-n-roll. This is an example to illustrate how the configuration system 100 may apply a proper configuration to the device subject to configure based on the user's real-time personal attribute. Skilled persons should understand there could be other varieties based on the same concept and should therefore be part of the present disclosure.

In one embodiment, assuming a digital dashboard (not shown in FIG. 1) in the vehicle which settings are subject to modifications. The settings may include the theme, the background color of the digital dashboard, and the contents displayed thereon. The collections of theme may include sport, delightfulness, sensibility, sense, mechanism, technology, nature, future, old fashion, cartoon, animes, city, urban, etc. If, in one instance, the user 20 is inferred to be a young man, the system 100 of present invention is operated to turn the theme of the digital dashboard to sport, future, or technology; while the color may be either black, blue, or walnut, etc. On the other hand, if a young female is in the vehicle, the system 100 of the present invention operates to modify the color of the digital dashboard into either a, for instance, a pinky or a light-blue one; while the theme may be of delightful, sensible, or natural. Further, if it is determined that all the users, including the driver and the passenger(s), are, for instance, below 44-year-old, the system 100 of the invention may be operated to choose a, such as, cartoon or animes theme. If, on the other hand, the users in the vehicle are, for instance, more than 75-year-old, the color may be adjusted to a bright one, while the theme may be old-fashioned, or of countryside.

In another embodiment, a device which settings are subject to adjust may be a navigator. Conventionally, users may manually set up the preferential points of interest (POIs) where they would like to visit. In light of the invention, the configuration system 100 can set up those POIs based on the user's personal attributes. For instance, the POIs may include, without limitation, restaurants, sporting goods stores, stadiums, sightseeing spots, electronics stores, outfit stores, department stores, etc. In one instance, if the user 20 is a male, the system 100 may operate to set up the POIs to include sporting goods stores, electronics stores, all-you-can-eat restaurants or suit shops. On the other hand, if the user 20 is a female, the POIs may be set to dessert stores, women's clothing stores or department stores. Moreover, if it is inferred that the user 20 is in a bad mood, the system 100 may modify the POIs to be a movie theater, a bar or a karaoke bar. Likewise, the adjustment of the settings for the navigator is based on the user's personal attributes inferred based on the facial descriptors. The operation of the invention saves the user's time to manually set up the preferences. It should be noted that in the above example, the setting of POIs is illustrated to demonstrate how a setting of a navigator may be accommodated based on the user's personal attributes; skilled persons should understand that there could be other settings which may be conducted in the same way.

In yet another embodiment, the device VA subject to modify based on the user's personal attributes may be an infotainment system which functions including audio, broadcast, and video. In such circumstance, the settings to be adjusted may be a selection of music tracks, video contents, or radio channels, etc. So, depending on the user's personal attributes, e.g. the gender, age, and/or emotional state, the infotainment system may play rock music or classical music, broadcast news, or display cartoons, comedies or other contents.

In further another instance, assuming the personal attributes considered include gender G, age A and emotion E; they are represented as a vector (G, A, E). Various combinations of gender G, age A, and emotion E constitute various vectors (Gn, An, En). Each vector may correspond to a set of configurations toward the vehicle device VA. In the example of digital dashboard, a vector may correspond to a theme of the digital dashboard. For example, if it is inferred that the user is a female, aged 20s and is in a happy mood (G1, A1, E1), such profile may correspond to a first theme, e.g. a leisure theme; while for another user who is a male in his late 40s and is upset with something (G2, A2, E2), the profile may correspond to a second theme, e.g. a classic artistic theme. FIG. 3 illustrates a table showing various vectors constituted by the personal attributes—gender, age and emotional state, and each of them corresponds to a theme. It should be noted however that FIG. 3 is provided for demonstration purposes only; other personal attributes and configurations toward different devices may also be applicable through the present disclosure.

Moreover, each of the personal attributes considered may be arbitrarily weighted. Following the above example, different weightings c1, c2, and c3 are given to the personal attributes gender G, age A, and emotion E, respectively. Thus, depending on the nature of the vehicle device VA subject to configure, the configuration system of the present disclosure may flexibly change the setting of the device VA by adjusting the weightings given to the personal attributes. For instance, when it comes to the inner lights, the present disclosure may give more attention to the user's mood instead of his/her gender and age. In another example, if it is the air conditioner that subject to modify, then the user's age may be more relevant than the gender and emotional state.

On the other hand, in some occasions the weightings applied to the personal attributes are not always constant but dynamic. That is, the configuration system of the present disclosure may predefine one or more criteria to decide the ultimate configuration by dynamically adjusting the weighting given to the personal attributes. For instance, when determining if a cute theme should apply to a digital dashboard, the configuration system of the present disclosure may minimize the weighting of gender when the user's age is more than a predefined number. Precisely, for those who are, for instance, more than 50, the cute theme probably would not be appealing to them. That is, when it is inferred that the user is more than 70-year-old, the configuration system of the present disclosure may reduce the weighting put on the personal attribute of gender. Alternatively, it may be another case where the configuration system may increase a weighting of one particular personal attribute when a criterion is met.

To sum up, the determination of the above may be illustrated through the following formula: $c_1 \cdot G + c_2 \cdot A + c_3 \cdot E < K$; where K is a predefined threshold to determine whether and which set of configurations should apply, wherein the hyper-parameters, e.g. $c_1$, $c_2$, $c_3$, K, is corresponding to a configuration.

In another aspect of the present disclosure, the configuration system may further optimize the settings through various combinations. Take the configuration of digital dashboard theme as an example. A theme may include multiple layers and each of them carries different settings. For instance, one layer may be a selection of the background color, another one layer may be a setting of the layout, and yet another layer may be a choice of the font and the font color. Additionally, each layer may have numbers of objects to be set up. The objects may be, for example, icons, background images, and sidebar images, etc. Thus, instead of having numbers of preset themes that indiscriminately apply to people with same characteristics, various combinations regarding the settings of instrument cluster can be achieved. That is, under the instant design, the configuration system of the present disclosure is able to further tailor-make a theme of the instrument cluster suitable to the user. For instance, if it is inferred that the user is a young lady who is in a happy mood, the configuration system of the present disclosure may synthesize a theme by constructing layers having a proper layout, a bright background color, a sound font with normal size and daisy-icons to apply to the instrument cluster. If now the user is a young boy, the icons may be replaced by basketball-icons and the rest settings remain the same. On the other hand, if it is inferred that the user is an old man, the theme may still be the same but the size of the font may be enlarged.

In another embodiment, the inference module relies upon the theory of confidence level, i.e. the probabilities, to infer the personal attributes. Particularly, the inference module of the present disclosure infers a user's personal attributes by probabilities. For instance, the inference module may infer that the User 1 is more likely than not to be a female who is 20s or below and is in a happy mood. Based on the combination of the personal attributes, the control unit modifies the corresponding device(s), such as a digital dashboard, accordingly, i.e. Profile 1. In another example, assuming the inference module infers that User 2 is more likely than not to be a male who is between 30 to 44-year-old and is sad, the control unit then configures the device (s) based on Profile 2.

Similarly, the theory of confidence level is also applicable to the determinations of configurations. For instance, following the above example, the choices of objects as well as layers of a theme may be determined by probabilities. Assuming the gender is given more weight in the instant scenario and three types of objects: sport, technology, and leisure are considered. If it has been determined that for males under 44, with 80% confidence level, may prone to technology objects, and females, with 90% confidence level, may prefer leisure objects and, with 10% confidence level, may also like technical objects. Additionally, for those over the age of 44, the gender may be neutralized and corresponding to classic objects. Furthermore, the selection of layers may also depend on gender. For instance, a 25-year-old male, with 99% confidence level, would prefer a high-contrast and dark black technology layer; a 40-year-old male, with 70% confidence level, may prone to a gray contrast technology layer, while a 40-year-old, female with 10% confidence level, may be a fan of a white technology layer, etc.

In the above examples three personal attributes, gender, age and emotional state are illustrated. It should however be noted that other personal attributes such as race, nationality, height, etc. may also be considered. Additionally, numbers of configurations with respect to various combinations of the personal attributes may be stored in the storage unit 110 of the present disclosure. Based on the user's real-time personal attributes, the configuration system 100 may select one configuration and apply the selected configuration to the device VA subject to configure. As mentioned previously, since the inference module 140 infers the user's personal attributes in real-time, the control unit 150 can dynamically modify the device VA accordingly. For example, the emotion attribute is considered a factor that is changing dynamically such that a dynamic and continuous inference may result in a dynamic change of the configurations.

In brief, the configuration system of the present disclosure modifies the devices installed in a vehicle such as the digital dashboard, the infotainment, the inner lights, the air conditioner, etc. based on one of, some of, party of, and any combination of the user's personal attributes. The personal attributes may include the user's gender, age, emotional state, race, nationality, height, etc. The personal attributes are inferred from the user's facial descriptors and may also consider his/her biological parameters.

Moreover, the configuration system 100 of the invention may further include numbers of sensors provided to collect environmental data surrounding the vehicle. The sensors may detect ambient light, temperatures (outside and/or inside the vehicle), the degree of humidity (outside and/or inside the vehicle) or barometric pressure, etc. In one embodiment, in addition to the user's personal attributes, the configuration system 100 also considers the environmental data to adjust the settings of devices VAs installed in the vehicle. For instance, if the temperature inside the vehicle is much higher than the outside temperature and the user is inferred as an elder, the configuration system 100 may be operated to reduce the inner temperature a little bit to keep the temperature difference within a certain degree and therefore avoid the user 20 from getting cold. Additionally, if it is inferred that the user 20 is depress, the system may be operated to brighten the light inside the vehicle to create a comfortable environment and/or play happy songs to cheer the user up.

Moreover, the configuration system 100 of this embodiment may further include a connecting module configured to communicate the vehicle with electronic devices, such as a mobile phone, not installed in the vehicle and/or a remote database through various of telecommunication protocols. The connecting module may be connected to the control unit 150. The connecting module may receive information related to, for instance, date, seasonal data, festivals, or the birthday of the user 20, etc. from a mobile device and/or the remote database. The control unit 150 may further consider the information therefore obtained together with the user's personal attributes and the environmental data to adjust the settings of the devices VAs installed in the vehicle. For example, if the inference module 140 determines that the user is a young male, the sensor indicates that outside temperature is low and the information further shows that now is winter, taking the totality, the configuration system 100 may be operated to configure the theme of the digital dashboard as dark-cold winter theme. Additionally, if it further shows that the Halloween is coming, not only the theme may be adjusted to Halloween-themed, but the configuration system 100 of the present invention may further set up a costume shop as one of the POIs where the user 20 can purchase costumes.

Although numbers of factors, such as the personal attributes, the environmental data as well as the gathered information, etc, are all referenced in the present invention, there may be a priority among these factors. As mentioned, the gender factor may have the priority over the other factors in some instances. That means, if there is a conflict between the settings, the configuration system 100 of the present invention will choose the setting correspond to the factor having the highest priority. Assuming a digital dashboard should be technology-themed if a user is a male; while the theme is supposedly to be anime-based if his age is below 44-year-old. Because, in the instant example, the gender factor has the priority, the digital dashboard is therefore technology-themed. Additionally, the modification of the devices VAs installed in a vehicle may be made pursuing to an overall assessment by multiplexing the personal attributes, the environmental data, and the gather information with various weightings. In a further example, the weighting given to the emotional state is larger than that is assigned to the age followed by the weighting awarded to the gender; and the weightings to the environmental data as well as the gathered information may be the least. Based on the overall assessment and the various weightings, the configuration system 100 is able to figure out the best parameters tailor-made for the user 20.

In the present invention, the settings of various devices with respect to different personal attributes of the user 20, environmental data, and the gather information may be stored in the storage unit 110. Alternatively, those settings and parameters may be downloaded from a remote server.

Figure 2:
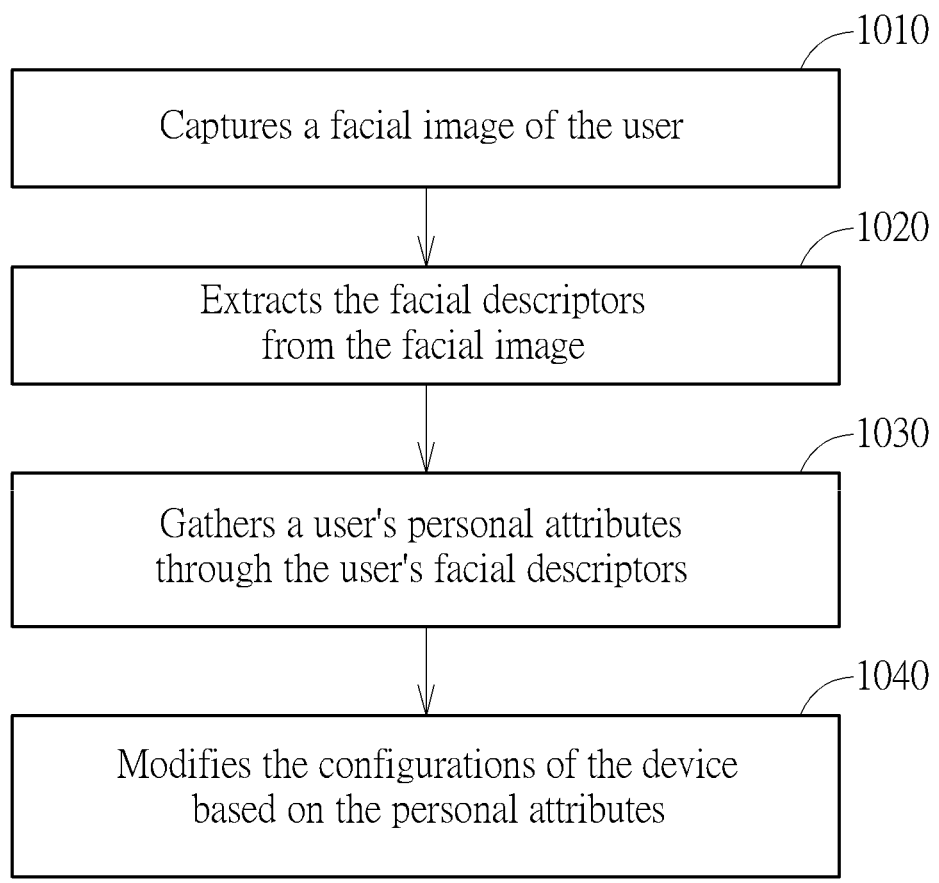
FIG. 2 is a schematic diagram showing a process flow of a vehicle configuration method of the present invention.

As shown in FIG. 2, a method of configuring a device installed in a vehicle in accordance with the present invention is illustrated. The method includes the following steps:

Action 1030: gathers, via e.g. an inference module, a user's personal attributes through the user's facial descriptors.

Action 1040: modifies, via e.g. a control unit, the configurations of the device based on the personal attributes.

As discussed, the instant disclosure may also include selecting one of the configurations from a storage unit where numbers of configurations are previously stored therein. The selected configuration is referenced to modify the device.

Aside from the above, the configuration method may further include:

Action 1010: captures, via e.g. an image capturing device, a facial image of the user.

Action 1020: extracts, via e.g. the face recognizing unit, the facial descriptors from the facial image. As discussed, the portions irrelevant to the identification of facial descriptors may be excluded from the facial image first to accelerate the processing time.

As mentioned previously, the inference module is pre-trained through a deep learning feeding with volumes of data. Additionally, the personal attributes may include the gender, the age and the emotional states of the user.

The above actions are discussed in order but the present invention may also be achieved by the same steps with a different order, or by additional steps. For instance, the method may include a step of collecting the environmental data through numbers of sensors. Additionally, the method may further include a step of receiving information remotely regarding date, seasonal data, holiday data, etc. These steps may be performed before the control unit 150 starts to adjust the settings, so that the control unit 150 may further consider the environmental data as well as the gathered information to change settings of the devices VA installed in the vehicle.

Additionally, the method may be implemented using software containing computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer or image processor embedded in a device, such as a laptop computer, entertainment console, net book, web book, tablet computing device, smart phone, or other mobile computing device). Such software can be executed, for example, on a single local computer or in a network environment (e.g., via the Internet, a wide-area network, a local-area network, a client-server network (such as a cloud computing network), or other such network) using one or more network computers. Additionally, any of the intermediate or final data created and used during implementation of the disclosed methods or systems can also be stored on one or more computer-readable media (e.g. non-transitory computer-readable media) and are considered to be within the scope of the disclosed technology. Furthermore, any of the software-based embodiments can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means. In one occasion, the storage unit 110 can also store the software for implementing any of the described techniques.

In summary, the present invention provides a configuration system and a method of configuring settings of devices installed in a vehicle based on personal attributes. The personal attributes may include the gender, the age, and the emotional states, etc. The personal attributes are inferred based on a user's facial descriptors. The settings may be adjusted based on one of, all of or some of the personal attributes. Through the arrangements of the present invention, not only it saves the user's time to manually set up the devices, but is also less troublesome.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system that configures a device installed in a vehicle based on a plurality of personal attributes of a user in the vehicle, comprising:
    a storage unit configured to store a plurality of configurations of the device;
    an image capturing device configured to capture a facial image of the user continuously; and
    a face recognizing unit coupled to the image capturing device and configured to extract user's facial descriptors from the facial image;
    an inference module configured to infer the personal attributes based on the facial descriptor dynamically in real-time, wherein the personal attributes comprises a gender, an age, and an emotional state;
    a plurality of sensors configured to collect environmental data surrounding the vehicle;
    a connecting module configured to communicate the vehicle with an electronic device, wherein the electronic device transmits informative data to the vehicle; and
    a control unit coupled to the inference module and the storage unit and configured to determine one of the configurations of the device according to a combination of the gender, age and emotional state and dynamically apply the one of the configurations to the device based on the personal attributes;
    wherein the system prioritizes the personal attributes, the environmental data and the informative data to configure the device.

2. The system of claim 1, wherein each of the personal attributes is arbitrarily weighted depending on the nature of the device.

3. The system of claim 1, wherein the inference module further predefines a criterion for one of the personal attributes; wherein when the criterion is met, the inference module either reduces or increases the weighting given to the personal attribute.

4. The system of claim 1, wherein the inference module relies upon the theory of confidence level to conclude the personal attributes of the user and determine the configuration applied to the device.

5. The system of claim 1, wherein the device is a digital dashboard which theme is subject to configure, wherein the theme includes a plurality of layers and a plurality of objects, and wherein the configuration may be any combination of the layers and objects depending on the combination of the personal attributes.

6. A method of configuring a device installed in a vehicle according to a plurality of personal attributes of a user in the vehicle, comprising:
    storing a plurality of configurations in a storage unit;
    capturing, through an image capturing device, a facial image of the user continuously;
    extracting the user's facial descriptors, through a face recognizing unit, from the facial image;
    wherein the inference of the personal attributes is made based on the facial descriptors;
    inferring, through an inference module, the user's personal attributes based on the facial descriptor dynamically in real-time, wherein the personal attributes comprises a gender, an age, and an emotional state;

gathering environmental data, through a plurality of sensors;

gathering informative data, through an electronic device transmitted to the vehicle;

determining, through a control unit, one of the configurations of the device according to a combination of the gender, age and emotional state, wherein the personal attributes, the environmental data, and the informative data are prioritized to determine the configuration applied to the device; and applying, through the control unit, the one of the configurations dynamically to the device based on the real-time personal attributes.

7. The method of claim 6, wherein each of the personal attributes is arbitrarily weighted depending on the nature of the device.

8. The method of claim 6, further comprising: predefining a criterion for one of the personal attributes; wherein when the criterion is met, the inference module either reduces or increases the weighting given to the personal attribute.

9. The method of claim 6, further comprising: concluding the personal attribute of the user and determining the configuration applied to the device by relying upon the theory of confidence level.

10. The method of claim 6, wherein the device is a digital dashboard which theme is subject to configure, wherein the theme includes a plurality of layers and a plurality of objects, and wherein the configuration may be any combination of the layers and objects depending on the combination of the personal attributes.

11. A non-transitory machine-readable storage medium including instructions, which performed by one or more processors, causing the one or more processors to perform a method in a vehicle to configure settings of a device installed in the based on a plurality of personal attributes of a user in the vehicle, the method comprising:

storing a plurality of configurations applicable to the device in a storage unit;

capturing a facial image of a user in a vehicle continuously;

extracting a plurality of facial descriptors of the user based on the facial image;

inferring a plurality of personal attributes dynamically in real-time based on the facial descriptors, wherein the personal attributes comprises a gender, an age, and an emotional state;

gathering environmental data, through a plurality of sensors;

gathering informative data, through an electronic device transmitted to the vehicle;

determining one of the configurations of the device according to a combination of the gender, age and emotional state, wherein the personal attributes, the environmental data, and the informative data are prioritized to determine the configuration applied to the device; and applying the one of the configurations dynamically to the device based on the personal attributes.

12. The medium of claim 11, further comprising arbitrarily weight each of the personal attributes in accordance with the nature of the device.

13. The medium of claim 11, further comprising predefining a criterion for one of the personal attributes; wherein when the criterion is met, the weighting given to the personal attribute is adjusted dynamically.

14. The medium of claim 11, further comprising: concluding the personal attributes of the user and determining the configuration applied to the device by relying upon the theory of confidence level.

* * * * *